United States Patent [19]

Speer

[11] 4,366,609

[45] Jan. 4, 1983

[54] COMPOSITE PULLEY AND METHOD FOR MAKING

[75] Inventor: Billy L. Speer, Springfield, Mo.

[73] Assignee: Dayco Corporation, Dayton, Ohio

[21] Appl. No.: 226,350

[22] Filed: Jan. 19, 1981

Related U.S. Application Data

[62] Division of Ser. No. 76,105, Sep. 17, 1979, abandoned.

[51] Int. Cl.³ .............................................. F16H 55/48
[52] U.S. Cl. .................................. 29/159 R; 264/266; 474/177
[58] Field of Search ............. 29/159 R; 264/262, 266; 474/168, 170, 177

[56] References Cited

U.S. PATENT DOCUMENTS

| 754,960 | 3/1904 | Bauer | 474/177 |
|---|---|---|---|
| 1,719,290 | 7/1929 | Danielson | 264/266 |
| 2,158,044 | 5/1939 | Haller | 264/266 |
| 2,413,817 | 1/1947 | Firth | 474/177 |
| 2,431,393 | 11/1947 | Franklin | 264/266 |
| 2,620,016 | 12/1952 | Adams | 264/266 |
| 2,720,119 | 10/1955 | Sherman | 264/262 |
| 3,200,665 | 8/1965 | Wells . | |
| 3,772,928 | 11/1973 | Gobeille | 29/159 R |

*Primary Examiner*—Lowell A. Larson
*Attorney, Agent, or Firm*—Joseph V. Tassone

[57] ABSTRACT

A novel composite pulley construction is provided, which comprises a continuous, metal peripheral belt supporting and bearing surface, and a plastic body. Also provided is a novel method for making a composite pulley.

12 Claims, 8 Drawing Figures

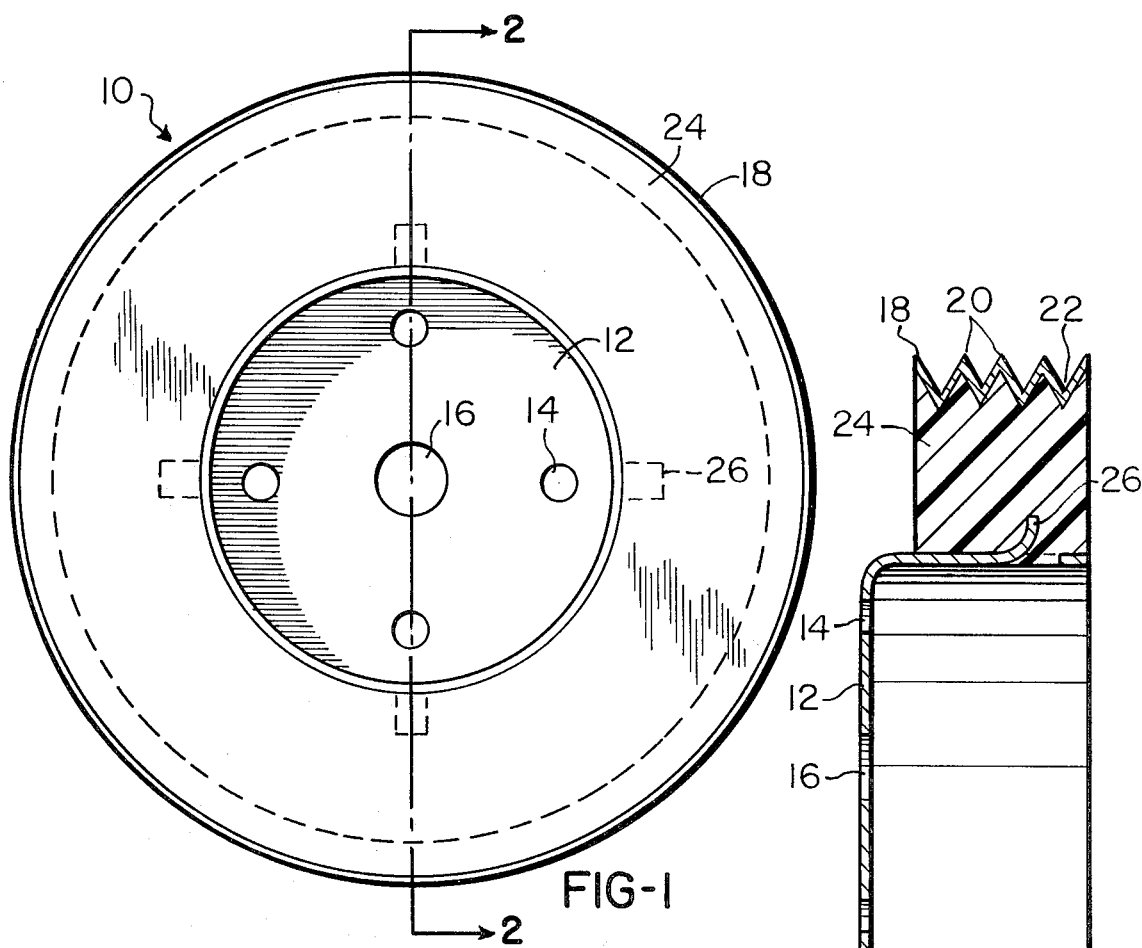
FIG-1
FIG-2
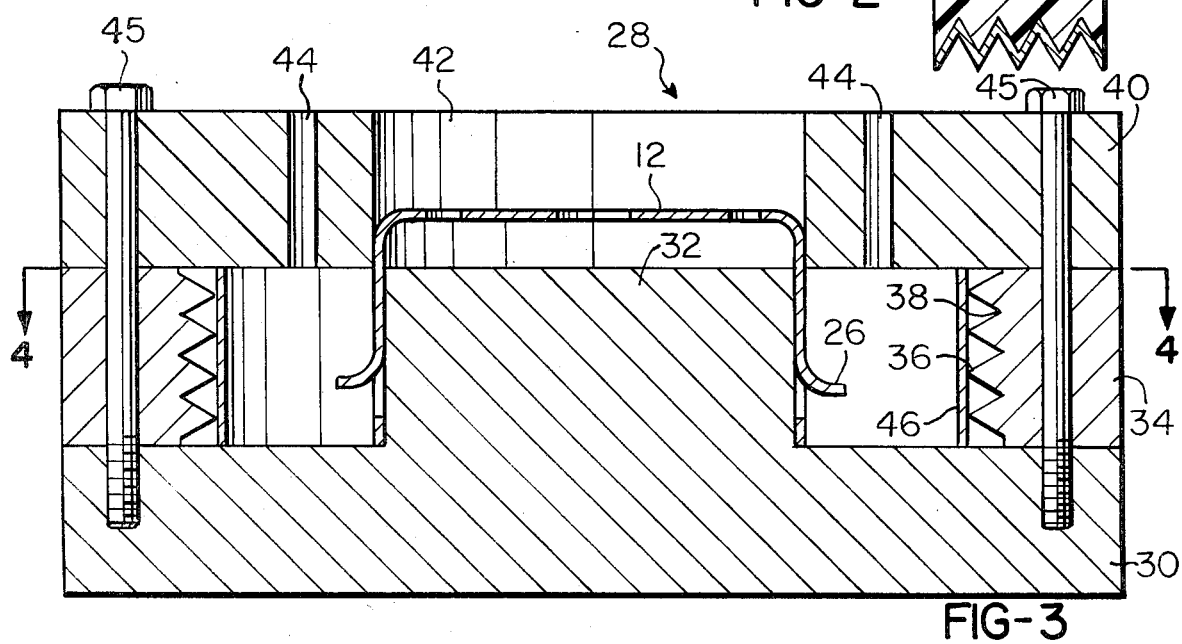
FIG-3

U.S. Patent  Jan. 4, 1983  Sheet 3 of 3  4,366,609
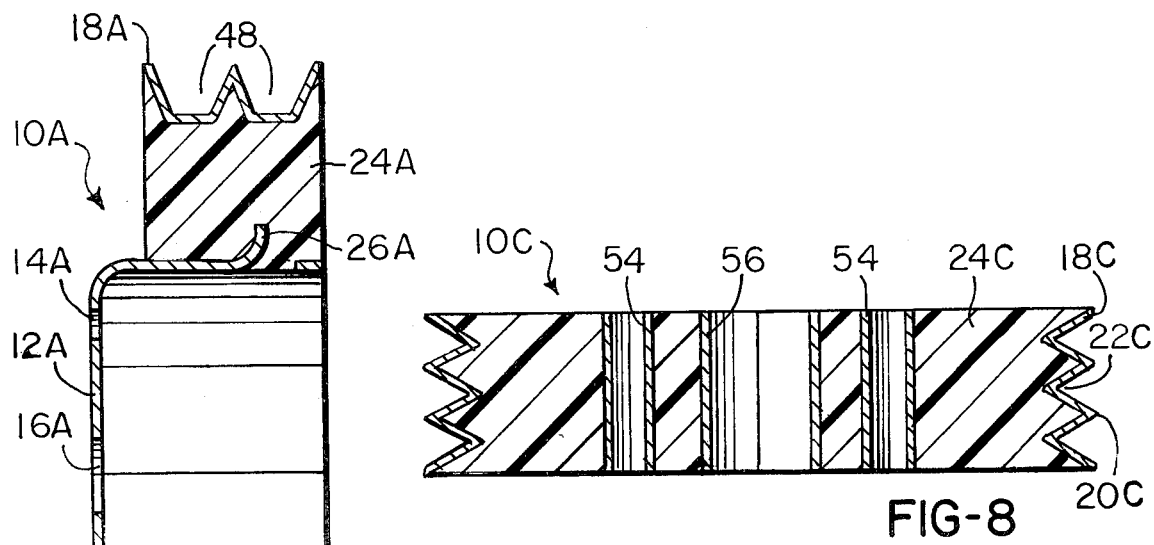
FIG-6
FIG-8
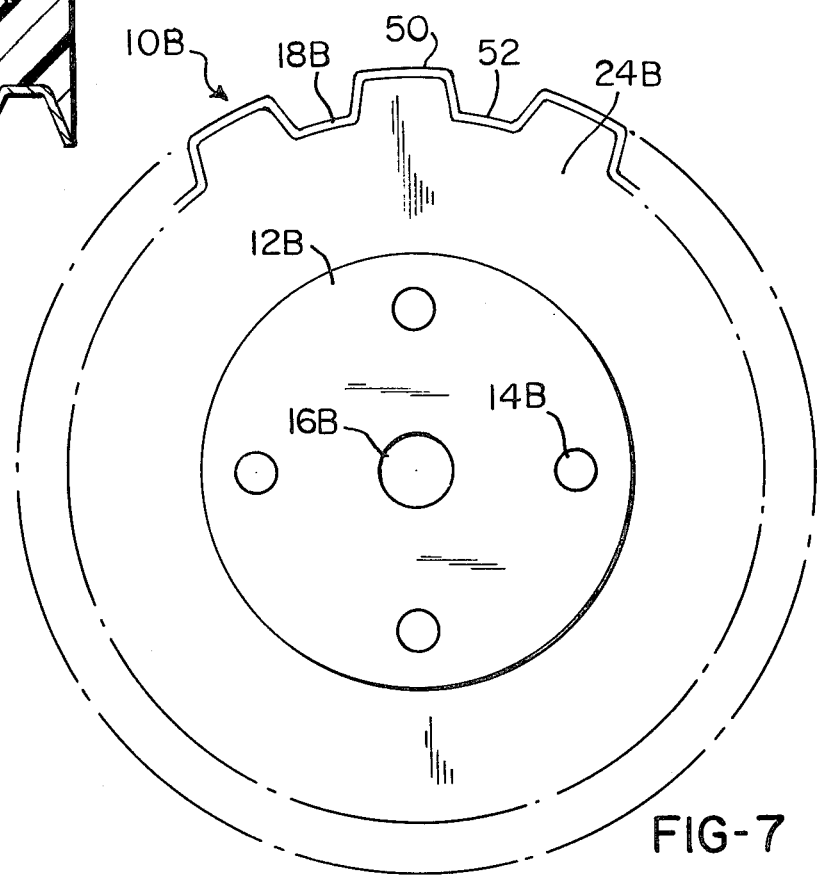
FIG-7

COMPOSITE PULLEY AND METHOD FOR MAKING

This is a division of application Ser. No. 76,105 filed Sept. 17, 1979, now abandoned.

BACKGROUND OF THE INVENTION

This invention relates to pulleys. In one aspect, it relates to a composite pulley made of metal and plastic. In another aspect, it relates to a method for manufacturing a composite pulley.

Molded plastic pulleys are well known in the art. Plastic pulleys are generally limited in application to fractional and subfractional power transmission systems because slipping and working of a belt wears a plastic pulley more quickly than a metal pulley.

It has been proposed to provide plastic pulleys with metal belt-bearing surfaces. U.S. Pat. No. 3,142,997 discloses an adjustable diameter V-belt pulley having a molded plastic body and a metal liner or facing element disposed for direct frictional engagement with a V-belt, the metal liner being mechanically interlocked with the plastic body. The metal liner is either spun or stamped into shape, and later interlocked with the plastic body.

U.S. Pat. No. 3,788,155 discloses a composite pulley comprising a preformed flange having a V-shaped groove, a metal bushing mounted in a central opening in the flange, and a plastic layer covering the opposed surfaces of the flange and the outside surface of the bushing.

It is an object of the present invention to provide a novel method for making composite pulleys.

It is another object of this invention to provide a novel composite pulley.

Other objects, aspects and advantages of the present invention will be apparent to those skilled in the art from the following description of the invention.

SUMMARY OF THE INVENTION

In accordance with the present invention, there is provided a method for making a composite pulley having at least one desired belt driving surface which comprises the steps of providing a mold means of a desired configuration, placing a mounting means within the mold cavity, placing a metal sleeve within the cavity and injecting a plastic material into the cavity between the mounting means and the metal sleeve, whereby the plastic causes the metal sleeve to deform to conform to the configuration of the mold.

Also provided in accordance with the present invention is a novel pulley construction comprising an outer peripheral, continuous, metal belt receiving and supporting surface, and a plastic body.

BRIEF DESCRIPTION OF THE DRAWINGS

In the drawings,

FIG. 1 illustrates one embodiment of a composite pulley in accordance with the invention;

FIG. 2 is a cross-section taken along the lines 2—2 of FIG. 1;

FIG. 3 is a cross sectional view of a mold which may be used to make a composite pulley;

FIGS. 6–8 illustrate three further embodiments of the composite pulley of this invention.

DETAILED DESCRIPTION OF THE DRAWINGS

Figure 4:
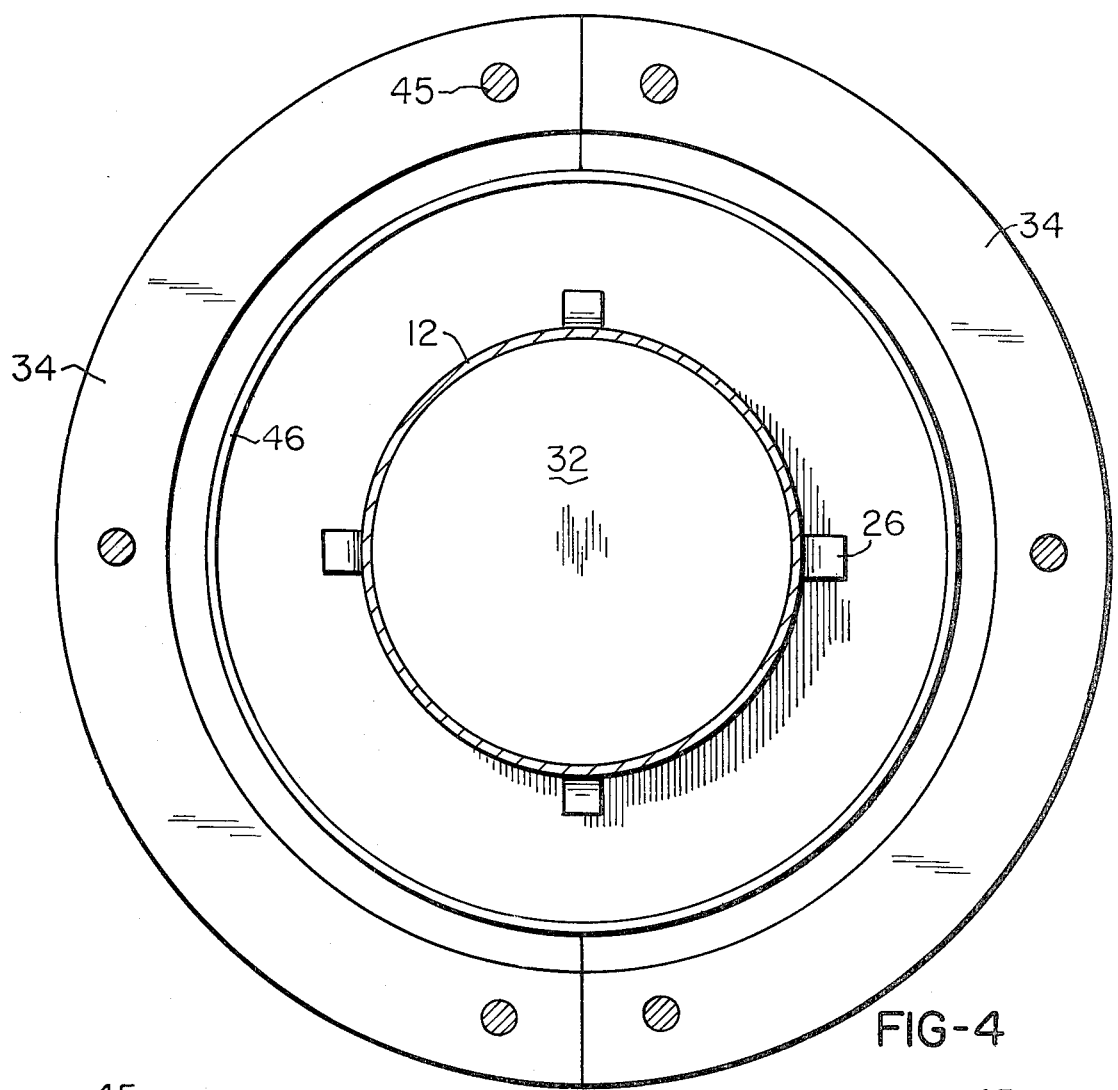
FIG. 4 is a cross-section taken along the line 4—4 of FIG. 3.

Referring to FIGS. 1 and 2, the composite pulley 10 comprises a cup-shaped metal hub 12 having a plurality of mounting holes 14 and a central mounting hole 16, these holes being in a single plane of the hub 12 for mounting the pulley 10 for rotation. The outer peripheral surface of the pulley 10 comprises a metal liner 18 having a plurality of V-shaped projections 20 and recesses 22. Surrounding the hub 12 and between the hub and the metal liner 18 is a plastic member 24. The hub 12 has a plurality of stamped tabs 26 which mechanically interlock with the plastic member 24.

Figure 5:
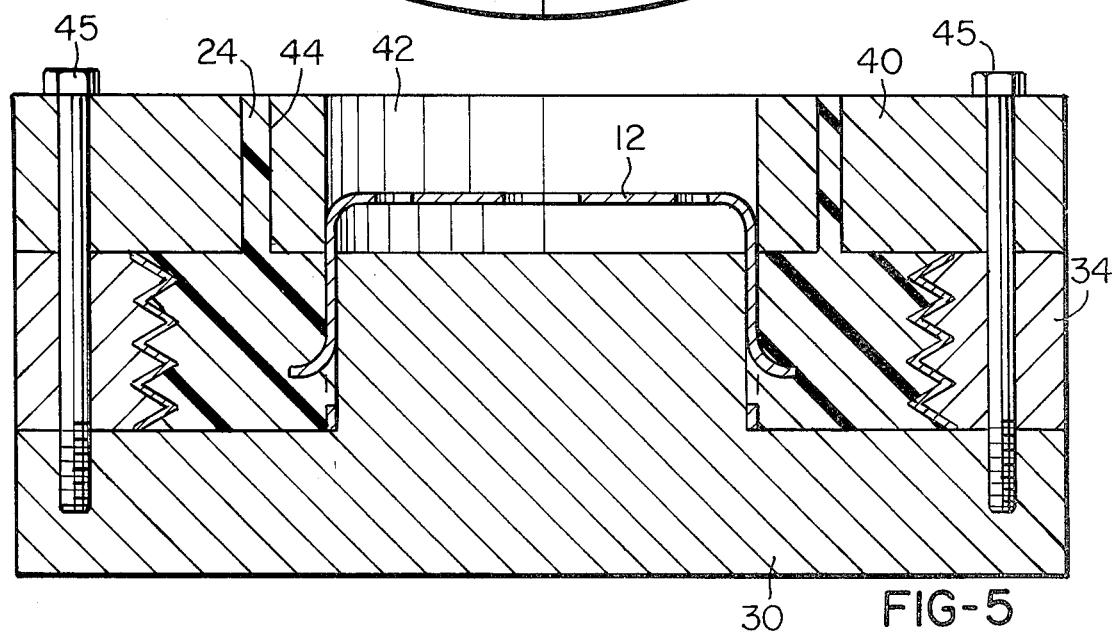
FIG. 5 illustrates the step of injecting a plastic into the mold cavity.

Referring now to FIGS. 3–5, the pulley 10 is formed using a three section mold, designated generally the the reference numeral 28. The first, or base section 30, has a raised cylindrical center portion 32 having an outside diameter approximately equal to the inside diameter of the hub 12. The second section 34 is segmented for removal of the completed pulley and has at least two movable segments. The segments 34, when in the molding position, form a circular opening. The inner periphery of the segments 34 has a plurality of V-shaped projections 36 and recesses 38. The third section 40 has a central opening 42 which has an inside diameter approximately equal to the outside diameter of the hub 12. The third section 40 also has at least one injection port 44. The mold sections may be clamped together by a suitable clamping means, such as bolts 45, as illustrated.

To make the pulley 10, the second section 34 is assembled on the first section and a hub 12 is inserted over the raised center portion 32 of the first mold section. A cylindrical metal sleeve 46 having an outside diameter approximately equal to the inside diameter of the projections 36 of the second section, is inserted in the mold. The third section 40 is assembled atop the second section 34 and the mold is clamped by inserting the bolts 45.

The pulley 10 is made by injecting a suitable plastic material 24 through the injection ports 44 under sufficient pressure, e.g. from about 500 to about 30,000 psi., to deform the metal sleeve 46, causing it to conform to the projections an recesses in the segments 34. Many types of plastics may be used in making the pulley of this invention, provided that they are distortion resistant at ambient and at high temperature. For automotive application, it is also desirable that the plastic have a low-temperature resiliency. Suitable plastics include thermoplastic and thermosetting materials, such as the polyamides, polyesters, epoxy resins, phenolic resin, high density polyethylene and the like, and preferably the fibrous glass-reinforced materials.

The metal sleeve 46 can be any suitable metal, such as steel or aluminum, which has the desired resistance to abrasion, and is sufficiently deformable so that it can be used in the practice of this invention. For example, mold steel having a thickness in the approximate range of 0.010- to 0.050-inch may be used.

It may be desirable to apply an adhesive on the inner surface of the metal sleeve to assure bonding between the metal and the plastic 24. Alternatively, the inner surface of the sleeve may be roughened by etching or sandblasting.

Other exemplary embodiments of pulleys in accordance with the present invention are illustrated in FIGS. 6-8. The parts of these pulleys which are similar to the parts of the pulley shown in FIGS. 1, 2 and 5 will be designated by the same reference numerals, followed by letter designations, and will not be again described in detail.

The pulley 10A shown in FIG. 6 differs from the pulley 10 only in that it has truncated V-shaped grooves 48 for use with V-belts.

The pulley 10B, shown in FIG. 7 is of the synchronous or timing, variety, and comprises a plurality of accurately spaced transverse projections 50 and recesses 52, to define a gear-like pulley.

The pulley 10C shown in FIG. 8 differs from the pulley 10 in that the hub 12 is replaced by mounting inserts 54 and a central insert 56.

Various changes and modifications may be made in light of the above disclosure without departing from the scope and spirit of the following claims.

I claim:

1. A method for manufacturing a composite pulley construction for use with at least one endless power transmission belt, said pulley construction comprising means for mounting said pulley for rotation, an outer peripheral metal surface for receiving and supporting said belt, and a molded plastic sheave supported by said mounting means and supporting said metal surface which comprises the steps of:
   (a) providing a mold means having a pulley-shaping cavity having a circumferential portion of desired configuration for forming said belt receiving and support surface;
   (b) disposing said mounting means within said cavity;
   (c) disposing a cylindrical metal sleeve within said cavity;
   (d) closing said cavity;
   (e) injecting a plastic material into said cavity between said mounting means and said metal sleeve under pressure;
   (f) forcing said plastic material under said pressure against said cylindrical metal sleeve;
   (g) deforming said cylindrical metal sleeve under pressure of said material to conform to said configuration of said circumferential portion; and
   (h) forming said receiving and supporting surface of said deformed sleeve.

2. The method of claim 1 wherein said providing step (a) comprises providing a mold means having a circumferential portion comprising at least one circumferential truncated V shape.

3. The method of claim 1 wherein said providing step (a) comprises providing a mold means having a circumferential portion comprising a plurality of alternating circumferential V-shaped projections and recesses.

4. The method of claim 1 wherein said providing step (a) comprises providing a mold means having a circumferential portion comprising a plurality of accurately spaced transverse projections and recesses.

5. The method of claim 1 wherein said disposing step (b) comprises disposing a cup-shaped mounting hub, having a plurality of mounting holes, within said cavity.

6. The method of claim 1 wherein said disposing step (b) comprises disposing a plurality of mounting inserts within said cavity.

7. The method of claim 1 wherein said disposing step (c) comprises disposing a metal sleeve having a thickness in the approximate range of 0.010 to 0.050 inch within said cavity.

8. The method of claim 7 wherein said sleeve is aluminum.

9. The method of claim 7 wherein said sleeve is mild steel.

10. The method of claim 1 wherein said plastic material is injected into said cavity under a pressure in the approximate range of 500 to 30,000 psi.

11. The method of claim 1 further comprising the intermediate step of roughening the inner surface of said metal sleeve prior to disposing the same in said cavity.

12. The method of claim 1 further comprising the intermediate step of applying an adhesive to the inner surface of said metal sleeve prior to disposing the same in said cavity.

* * * * *